No. 834,685. PATENTED OCT. 30, 1906.
C. C. SIBLEY & G. A. LUTZ.
CONDUIT FOR ELECTRIC WIRES.
APPLICATION FILED OCT. 26, 1905.
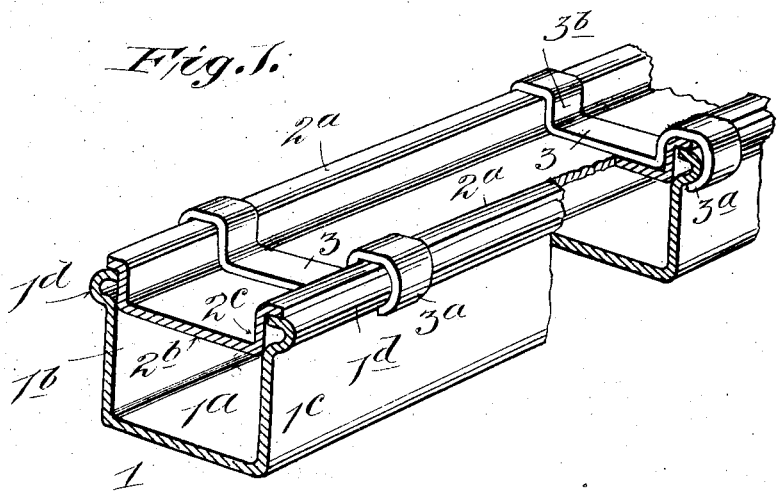
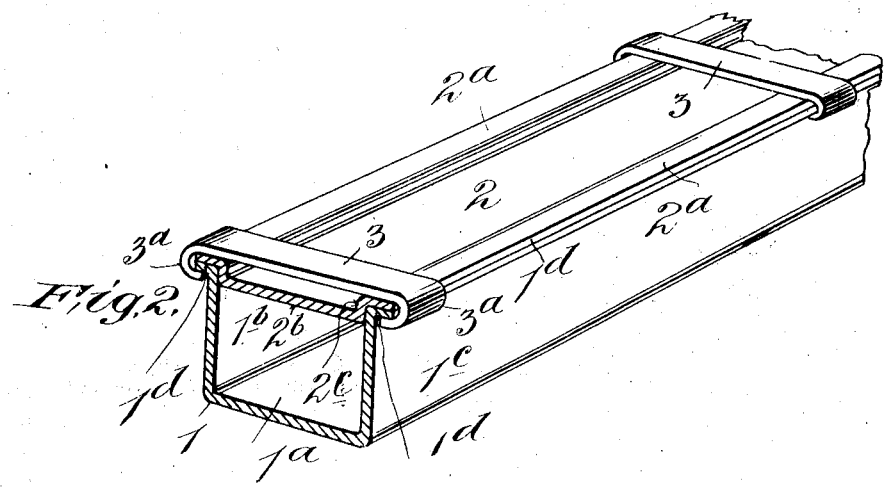

UNITED STATES PATENT OFFICE.

CLARENCE C. SIBLEY, OF PERTH AMBOY, NEW JERSEY, AND GEORGE A. LUTZ, OF NEW YORK, N. Y.

CONDUIT FOR ELECTRIC WIRES.

No. 834,685.   Specification of Letters Patent.   Patented Oct. 30, 1906.

Application filed October 26, 1905. Serial No. 284,471.

*To all whom it may concern:*

Be it known that we, CLARENCE C. SIBLEY, residing in Perth Amboy, Middlesex county, New Jersey, and GEORGE A. LUTZ, residing in New York city, borough of Brooklyn, New York, citizens of the United States, have invented certain new and useful Improvements in Conduits for Electric Wires, of which the following is a specification.

Our invention relates to improvements in the class of conduits having one side open to permit access to the contained wires and a removable cover thereon; and the object of the invention is to provide improved means for detachably holding the cover upon the conduit, also providing means to prevent a tool from engaging the contained wires or insulation by being pushed between the cover and the conduit.

The invention comprises a conduit having one side open and provided at the edges with outwardly-extending flanges or ribs, a cover having its edges laid upon said flanges or ribs, and clips over the cover and having inwardly-bent end portions gripping said flanges to hold the cover upon the conduit, and by preference the cover is depressed in a longitudinal direction between its edges, whereby such depressed portion of the cover enters the conduit to prevent the entrance of a tool into the conduit between the flanges or ribs on the conduit and the edges of the cover.

Reference is to be had to the accompanying drawings, forming part hereof, wherein—

Figure 1 is a perspective view, partly broken, of a conduit embodying our invention; and Fig. 2 is a similar view showing a modification.

In the accompanying drawings, in which similar numerals of reference indicate corresponding parts in the views, the conduit 1 has a longitudinal channel with one side open, and by preference we form the conduit from a sheet or strip of suitable metal by bending the same into substantially rectangular form, providing a bottom $1^a$, sides $1^b$ $1^c$, and flanges or ribs $1^d$ at the edges of the side walls extending longitudinally of the conduit and projecting outwardly beyond such walls.

In Fig. 1 the flanges or ribs $1^d$ are bent in groove form having curved outer edges, and in Fig. 2 the flanges $1^d$ extend outwardly from the side walls at substantially right angles thereto. 2 indicates a cover placed over the open side of the conduit and having its outer edges $2^a$ laid upon the flanges or ribs $1^d$, and at 3 are clips extending transversely across and upon the cover and having their ends at $3^a$ bent around and under the flanges or ribs $1^d$, said clips holding the cover firmly upon the conduit, whereby said clips may be readily removed when the cover is to be detached from the conduit. The clips may be formed as shown in Fig. 1, and when applied or detached their bent spring-like ends may be sprung over the ribs $1^d$, as the outer edges of said ribs are rounded.

In the form shown in Fig. 2 one end of the clip may be made in curved form, as $3^a$, and the other end left straight or partially bent, and when the clip is applied over the cover its curved end will first engage a rib $1^d$, and then the straight or partially-bent end may be bent under the rib $1^d$.

By preference the cover 2 is depressed centrally, as at $2^b$, forming walls or shoulders $2^c$ between the side edges $2^a$ and the central portion, whereby if a tool, nail, or the like is pushed between the flanges $1^d$ of the conduit and the edges $2^a$ of the cover the tool or the like will be prevented by the wall $2^c$ from engaging the contained wire or insulation thereon.

As shown in Fig. 1, the clips 3 are bent centrally to correspond to the shape of the cover 2, so that the clip will fit firmly and snugly upon such cover, the bent portions $3^b$ of the clips corresponding to the plane of the walls $2^c$, whereby the clips are prevented from being readily torn away from the conduit. For some use, however, the clips 3 need not be bent centrally, but may extend straight across the cover, as in Fig. 2.

Having now described our invention, what we claim is—

1. A conduit having outwardly-extending flanges, a cover having a depressed portion between its outer edges, said edges overlying said flanges, and clips over the cover having their ends engaging said flanges, substantially as described.

2. A conduit having outwardly-extending flanges, a cover having a depressed portion between its outer edges, said edges overlying said flanges, and clips over the cover having their ends engaging said flanges, said clips being bent between their ends to enter the depressed portion of the cover, substantially as described.

CLARENCE C. SIBLEY.
GEO. A. LUTZ.

Witnesses:
T. F. BOURNE,
M. HOLLINGSHEAD.